(12) United States Patent
Fasoli et al.

(10) Patent No.: US 10,140,800 B2
(45) Date of Patent: Nov. 27, 2018

(54) REMOTE CONFIGURATION OF EMV TERMINALS

(75) Inventors: Jonathan D. Fasoli, Palo Alto, CA (US); Yogish Pai, Santa Clara, CA (US); Maksim L. Rokhline, Castro Valley, CA (US); Jugdip S. Bath, San Ramon, CA (US)

(73) Assignee: INTUIT INC., Mountain View, CA (US)

( * ) Notice: Subject to any disclaimer, the term of this patent is extended or adjusted under 35 U.S.C. 154(b) by 1286 days.

(21) Appl. No.: 13/361,067

(22) Filed: Jan. 30, 2012

(65) Prior Publication Data

US 2013/0198067 A1  Aug. 1, 2013

(51) Int. Cl.
*G06Q 20/40* (2012.01)
*G06Q 20/32* (2012.01)
*G06Q 20/12* (2012.01)
*G07F 7/08* (2006.01)
*G06Q 20/34* (2012.01)

(52) U.S. Cl.
CPC ....... *G07F 7/0873* (2013.01); *G06Q 20/3567* (2013.01)

(58) Field of Classification Search
CPC ........ G06Q 20/40; G06Q 20/32; G06Q 20/12; G06Q 20/327; G06Q 20/367; G06Q 20/382; G06Q 20/385; G06Q 20/3829
USPC .......................................................... 705/65
See application file for complete search history.

(56) References Cited

U.S. PATENT DOCUMENTS

| | | | |
|---|---|---|---|
| 7,103,570 B1* | 9/2006 | Morea | G06Q 20/382 705/26.1 |
| 2008/0109535 A1 | 5/2008 | Mccue | |
| 2008/0215668 A1* | 9/2008 | Hu | H04L 41/0806 709/202 |
| 2009/0150247 A1* | 6/2009 | Bacastow | G06Q 20/20 705/16 |
| 2009/0198803 A1 | 8/2009 | Meckenstock | |
| 2010/0016683 A1 | 1/2010 | Lemmers et al. | |
| 2012/0173431 A1* | 7/2012 | Ritchie | G06Q 20/367 705/65 |

FOREIGN PATENT DOCUMENTS

KR  10-2009-056019  6/2009
WO  2010128442 A2  11/2010

OTHER PUBLICATIONS

European Office Action dated Nov. 11, 2016 for Application No. 127430528.8.

* cited by examiner

*Primary Examiner* — Hai Tran
(74) *Attorney, Agent, or Firm* — Patterson + Sheridan, LLP

(57) ABSTRACT

During a device programming technique, a merchant provides account information associated with a smart-card terminal to a portable electronic device (such as a cellular telephone), which is coupled to the smart-card terminal. In response, the portable electronic device provides the account information to a computer remotely located relative to the portable electronic device. Then, the computer provides a merchant identifier and a terminal identifier to the portable electronic device. Next, the portable electronic device provides the merchant identifier and the terminal identifier to the smart-card terminal, thereby facilitating programming of the smart-card terminal.

18 Claims, 4 Drawing Sheets

REMOTE CONFIGURATION OF EMV TERMINALS

BACKGROUND

The present disclosure relates to techniques for programming smart-card terminals. More specifically, the present disclosure relates to a technique that facilitates remote programming of a Europay MasterCard Visa (EMV) terminal using a portable electronic device.

Many financial transactions are conducted using smart-card terminals, such as an EMV terminal in which consumers conduct a financial transaction using a smart card that includes a chip that contains financial information and also by providing a personal identification number (PIN). Typically EMV terminals are configured by a manufacturer or a distributor.

However, this configuration approach is cumbersome and inflexible. In particular, this configuration approach obstructs other channels, such as: sales of smart-card terminals in retails stores, giving away smart-card terminals at trade shows, etc. As a consequence, it is often difficult or expensive to provide EMV terminals to smaller merchants.

SUMMARY

The disclosed embodiments relate to a portable electronic device that facilitates programming of a smart-card terminal. After the portable electronic device is coupled to the smart-card terminal, the portable electronic device receives account information associated with the smart-card terminal from a merchant. In response, the portable electronic device provides the account information to a computer remotely located relative to the portable electronic device. Then, the portable electronic device receives, from the computer, a merchant identifier and a terminal identifier. Next, the portable electronic device provides the merchant identifier and the terminal identifier to the smart-card terminal, thereby facilitating programming of the smart-card terminal.

In some embodiments, a first time the smart-card terminal is programmed, the portable electronic device receives a smart-card-terminal configuration file which includes information specific to a financial institution associated with the smart-card terminal. In response, the portable electronic device provides the smart-card-terminal configuration file to the smart-card terminal.

Note that the merchant identifier and the terminal identifier provided to the smart-card terminal may be encrypted.

Moreover, the smart-card terminal may include a Europay MasterCard Visa (EMV) terminal. In some embodiments, during a financial transaction, the smart-card terminal receives a user PIN code and financial information stored in a memory on a smart card.

Additionally, the portable electronic device may provide an electronic identity for the smart-card terminal to the computer until the programming of the smart-card terminal is completed.

Note that the smart-card terminal may be reprogrammed via the portable electronic device when additional account information is received. This additional account information may be associated with one of the merchant and another merchant.

Another embodiment provides a method that includes at least some of the operations performed by the portable electronic device.

Another embodiment provides a computer-program product for use with the portable electronic device. This computer-program product includes instructions for at least some of the operations performed by the portable electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a portable electronic device, a technique for facilitating programming of a smart-card terminal, and a computer-program product (e.g., software) for use with the portable electronic device are described. During this device programming technique, a merchant provides account information associated with a smart-card terminal to a portable electronic device (such as a cellular telephone), which is coupled to the smart-card terminal. In response, the portable electronic device provides the account information to a computer remotely located relative to the portable electronic device. Then, the computer provides a merchant identifier and a terminal identifier to the portable electronic device. Next, the portable electronic device provides the merchant identifier and the terminal identifier to the smart-card terminal, thereby facilitating programming of the smart-card terminal.

By facilitating programming of a smart-card terminal, the device programming technique may eliminate the need for inflexible configuration of the smart-card terminal by a manufacturer or a distributer. In fact, the device programming technique may eliminate the need for pre-configuring of the smart-card terminal by a distributer. Instead, the smart-card terminal may be remotely programmed, as needed, via the portable electronic device. As a consequence, the device programming technique may expand the use of smart-card terminals by smaller merchants and, thus, may promote commercial activity.

In the discussion that follows, a user may include: an individual (for example, an existing customer, a new customer, a service provider, a vendor, a contractor, etc.), an organization, a business (such as a merchant) and/or a government agency. Furthermore, a 'business' should be understood to include: for-profit corporations, non-profit corporations, organizations, groups of individuals, sole proprietorships, government agencies, partnerships, etc.

Figure 1:
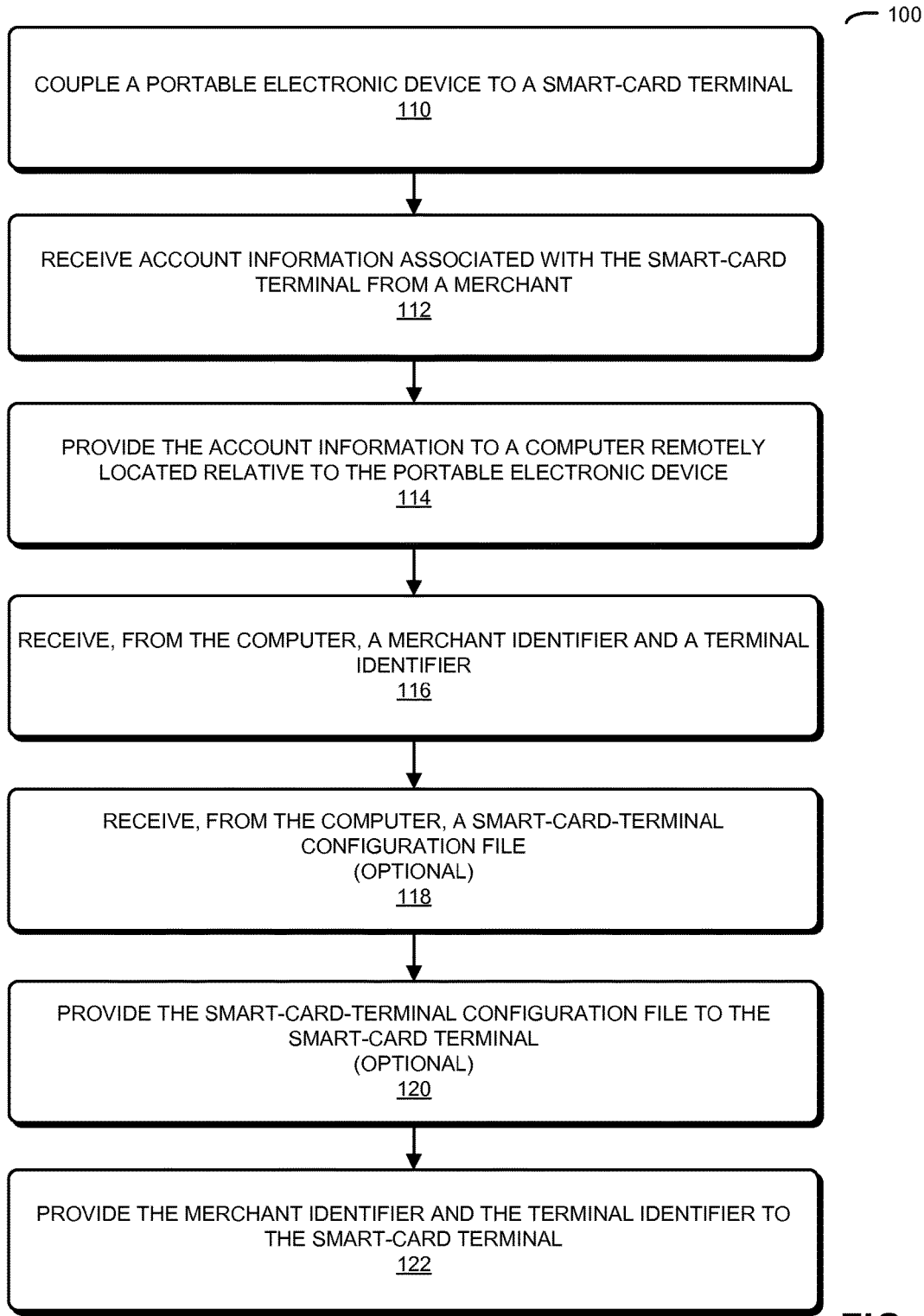
FIG. 1 is a flow chart illustrating a method for facilitating programming of a smart-card terminal in accordance with an embodiment of the present disclosure.

We now describe embodiments of the device programming technique, which may be performed by a system (such as system 300 in FIG. 3) and/or a portable electronic device (such as portable electronic device 400 in FIG. 4) in this system. FIG. 1 presents a flow chart illustrating a method 100 for facilitating programming of a smart-card terminal. During operation, the portable electronic device is coupled to the smart-card terminal (operation 110). For example, the smart-card terminal may include a Europay MasterCard Visa (EMV) terminal. Moreover, in some embodiments, during a financial transaction, the smart-card terminal receives a user PIN code and financial information stored in a memory on a smart card.

After the portable electronic device is coupled to the smart-card terminal (operation 110), the portable electronic device receives account information associated with the smart-card terminal from a merchant (operation 112). In response, the portable electronic device provides the account information to a computer remotely located relative to the portable electronic device (operation 114). Then, the portable electronic device receives, from the computer, a merchant identifier and a terminal identifier (operation 116). Note that the merchant identifier and the terminal identifier provided to the smart-card terminal may be encrypted.

Next, the portable electronic device provides the merchant identifier and the terminal identifier to the smart-card terminal (operation 122), thereby facilitating programming of the smart-card terminal.

In some embodiments, a first time the smart-card terminal is programmed, the portable electronic device optionally receives, from the computer, a smart-card-terminal configuration file (operation 118) which includes information specific to a financial institution associated with the smart-card terminal. In response, the portable electronic device optionally provides the smart-card-terminal configuration file to the smart-card terminal (operation 120).

Note that the portable electronic device may provide an electronic identity for the smart-card terminal to the computer until the programming of the smart-card terminal is completed. Furthermore, using method 100, the smart-card terminal may be reprogrammed via the portable electronic device when additional account information is received or whenever the portable electronic device is decoupled from the smart-card terminal (which may ensure regulatory compliance). This additional account information may be associated with one of the merchant and another merchant. Thus, the same merchant may provide the additional account information (such as account information for a different account) or a different merchant may provide the additional account information (i.e., different merchants may be able to use the same smart-card terminal).

Figure 2:
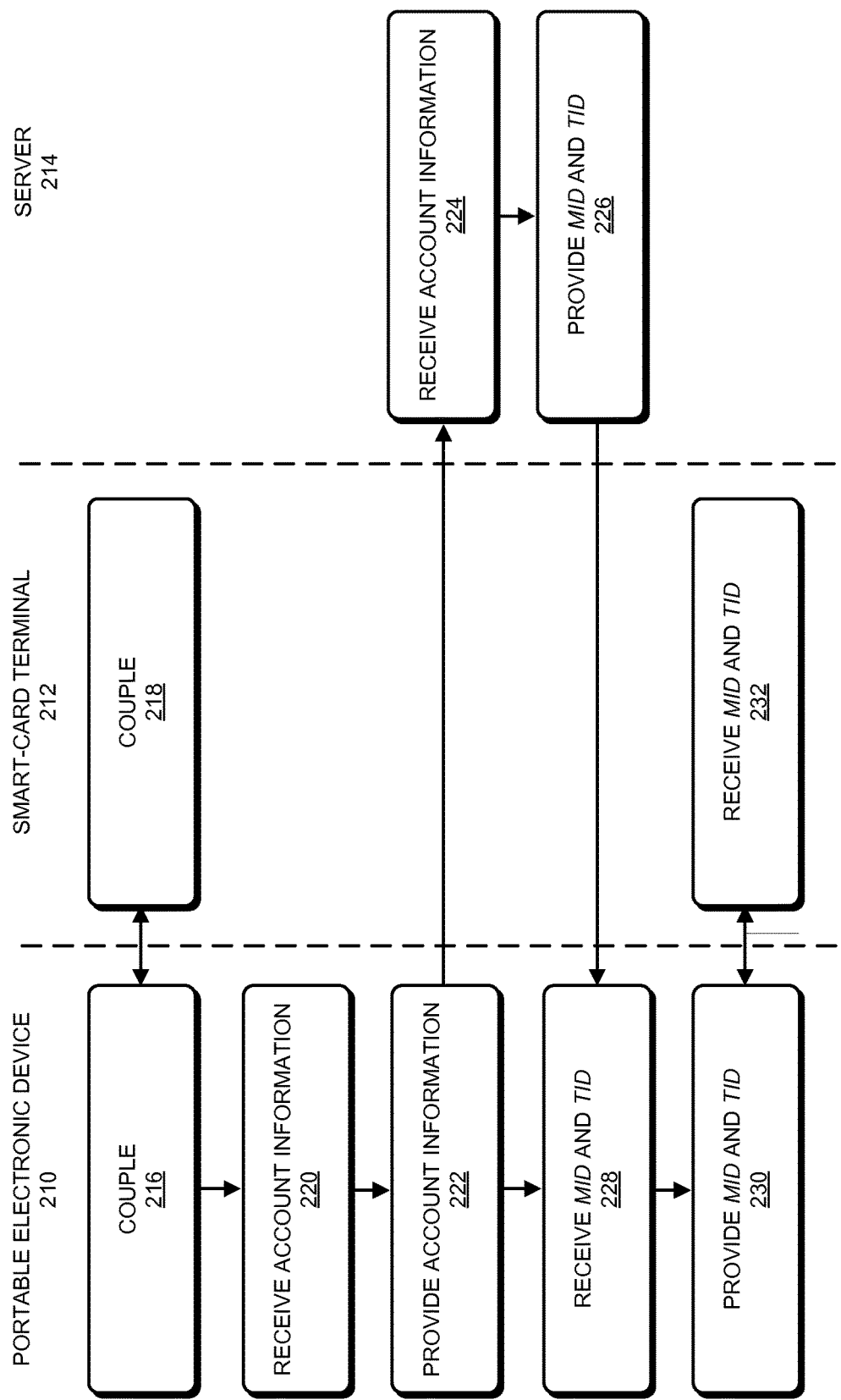
FIG. 2 is a flow chart illustrating the method of FIG. 1 in accordance with an embodiment of the present disclosure.

In an exemplary embodiment, the device programming technique is implemented using a portable electronic device (such as a cellular telephone) and at least one server, which communicate through a network, such as a cellular-telephone network and/or the Internet (e.g., using a client-server architecture). This is illustrated in FIG. 2, which presents a flow chart illustrating method 100 (FIG. 1). During this method, portable electronic device 210 is coupled (operations 216 and 218) to smart-card terminal 212. Then, portable electronic device 210 receives account information (operation 220) associated with the smart-card terminal from a user (such as a merchant). Moreover, portable electronic device 210 provides account information (operation 222) to server 214.

After receiving the account information (operation 224), server 214 provides a merchant identifier (MID) and a terminal identifier (TID) (operation 226), which are subsequently received by portable electronic device 210 (operation 228). Next, portable electronic device 210 provides the merchant identifier and the terminal identifier to smart-card terminal 212 (operation 230), which are subsequently received by smart-card terminal 212 (operation 232). In this way, method 100 can be used to facilitate programming of the smart-card terminal.

In some embodiments, a first time the smart-card terminal is programmed, the portable electronic device 210 receives a smart-card-terminal configuration file which includes information specific to a financial institution associated with smart-card terminal 212 from server 214. This smart-card-terminal configuration file may be provided to smart-card terminal 212 during operation 228.

In some embodiments of method 100 (FIGS. 1 and 2), there may be additional or fewer operations. Moreover, the order of the operations may be changed, and/or two or more operations may be combined into a single operation.

In an exemplary embodiment, the device programming technique is used to facilitate programming of an EMV terminal. Typically, the hardware in an EMV terminal is configured by a distributor using: an EMV configuration file, a merchant identifier, and a terminal identifier. However, the resulting configured EMV terminal usually can only be used by a particular merchant for the lifetime of the EMV terminal. In the device programming technique, EMV terminals (and, more generally, smart-card terminals) can be remotely programmed, which allows the EMV terminals to be exchanged among different merchants. This flexibility allows new distribution channels, minimizes the requisite supply chain and backend systems, and reduces the difficulties associated with adding or replacing EMV terminals.

In particular, an EMV terminal may be programmed using a cellular telephone. A merchant may receive a standard EMV terminal. After plugging the EMV terminal into the cellular telephone, the cellular telephone may act as an intermediary and provide an identity to the EMV terminal until it is programmed. Then, the merchant may sign in to an account, such as a financial account with a financial institution that is associated with the EMV terminal. In response, a server associated with the financial institution may provide: the EMV configuration file (which may be specific for a financial processor associated with a particular financial institution and the EMV terminal), a merchant identifier, and a terminal identifier. This information may be provided to the EMV terminal in a secure fashion (for example, using encrypted communication, such as that used in a Secure Sockets Layer). After receiving the EMV configuration file, the merchant identifier, and/or the terminal identifier, the EMV terminal may decrypt this information (using a predefined encryption technique) and pass it to hardware in the EMV terminal, which then self-configures. In this way, a standard EMV terminal may be remotely programmed so that it is ready for use.

Note that when the EMV terminal is unplugged from the cellular telephone, the EMV configuration file and/or the terminal identifier may remain on the EMV terminal (i.e., it may be stored on the EMV terminal). However, the merchant identifier and/or the terminal identifier may not remain on the EMV terminal when it is unplugged. Thus, the merchant or another merchant may subsequently couple another cellular telephone to the EMV terminal and may still be able to use the EMV terminal. This may allow a new configuration (such as another merchant identifier and/or another terminal identifier) associated with another account to be programmed into the EMV terminal. In addition, the capability may ensure that the EMV terminal is regulatory compliant.

Figure 3:
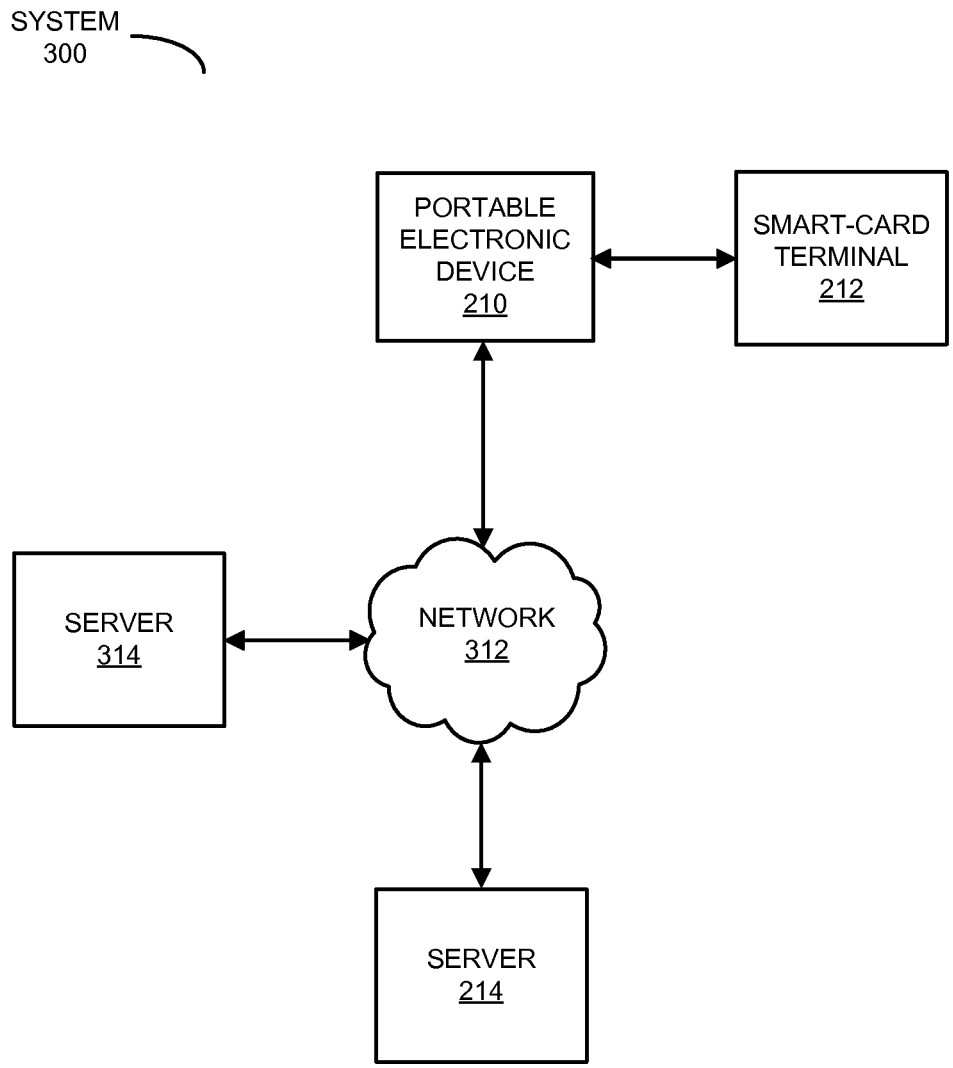
FIG. 3 is a block diagram illustrating a system that performs the method of FIGS. 1 and 2 in accordance with an embodiment of the present disclosure.

We now describe embodiments of the system and the portable electronic device, and their use. FIG. 3 presents a block diagram illustrating a system 300 that performs method 100 (FIGS. 1 and 2). In this system, a user (such as a merchant) of portable electronic device 210 may use a software product, such as a financial software application that is resident on and that executes on portable electronic device 210. (Alternatively, the user may interact with a web page that is provided by server 214 via network 312, and which is rendered by a web browser on portable electronic device 210. For example, at least a portion of the financial software application may be an application tool that is embedded in the web page, and which executes in a virtual environment of the web browser. Thus, the application tool may be provided to the consumer via a client-server architecture.) This financial software application may be a stand-alone application or a portion of another application that is resident on and which executes on portable electronic device 210 (such as a software application that is provided by server 214 or that is installed and which executes on portable electronic device 210).

As discussed previously, the user of portable electronic device 210 may receive smart-card terminal 212 (for example, via mail, from a retail store, from a friend, etc.). The user may plug the smart-card terminal into portable electronic device 210. Then, the user may use the financial software application to configure smart-card terminal 212.

In particular, the user may provide account information to server 214 via network 312 using the financial software application. In response, server 214 may provide a configuration file, a merchant identifier and/or a terminal identifier to the financial software application on portable electronic device 210 via network 312.

The financial software application may use the configuration file, a merchant identifier and/or a terminal identifier to configure smart-card terminal 212. For example, portable electronic device 210 may provide, via network 312, the configuration file, a merchant identifier and/or a terminal identifier to smart-card terminal 212. Then, smart-card terminal 212 may self-initialize. After smart-card terminal 212 is programmed, the user may perform financial transactions using smart-card terminal 212 and/or portable electronic device 210 with server 314 (which is associated with a financial institution) via network 312.

Note that smart-card terminal 212 may store information associated with the configuration file even after smart-card terminal 212 is no longer coupled to portable electronic device 210. Alternatively, during a subsequent log-in (i.e., when the account information is provided), portable electronic device 210 may: detect smart-card terminal 212 (i.e., may detect existing or previously configured hardware), provide the account information to server 214 via network 312, and receive the terminal identifier, which is then communicated to smart-card terminal 212.

Information in system 300 may be stored at one or more locations in system 300 (i.e., locally or remotely). Moreover, because this data may be sensitive in nature, it may be encrypted. For example, stored data and/or data communicated via network 312 (such as the configuration file, the merchant identifier and/or the terminal identifier) may be encrypted.

Figure 4:
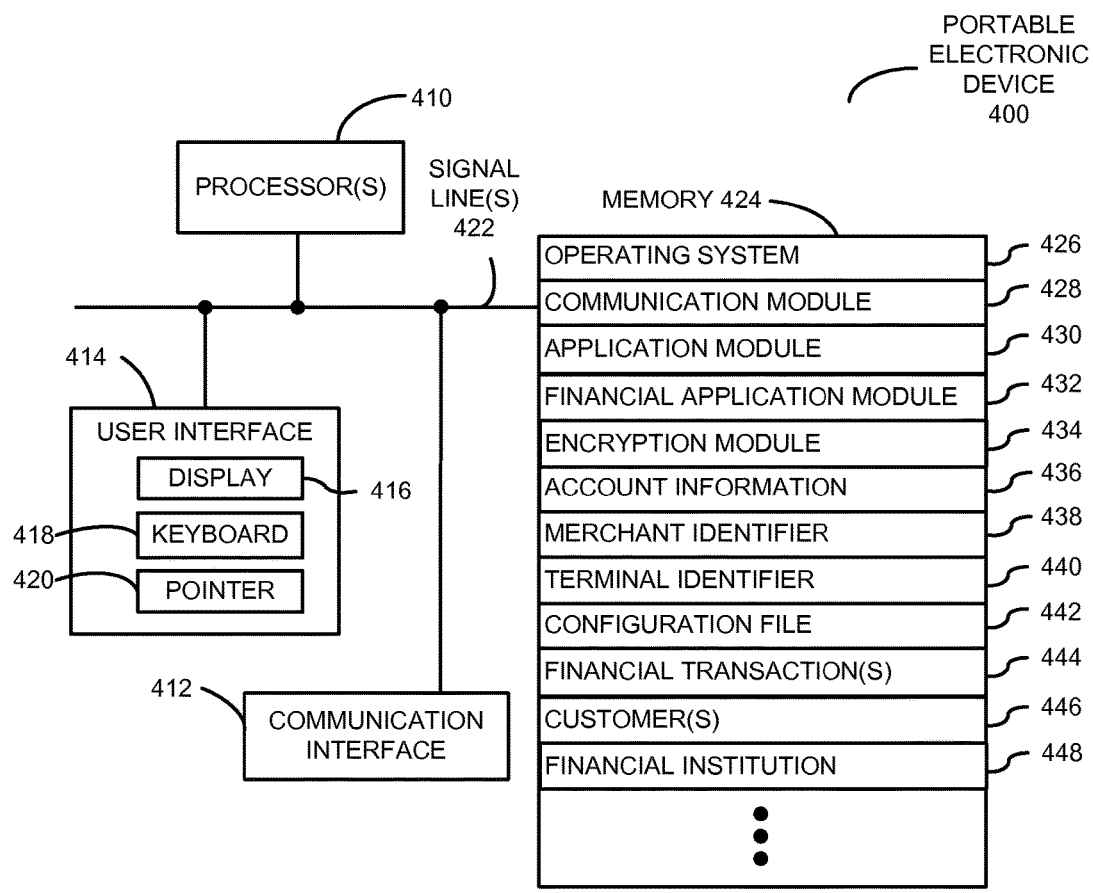
FIG. 4 is a block diagram illustrating a portable electronic device that performs the method of FIGS. 1 and 2 in accordance with an embodiment of the present disclosure.

FIG. 4 presents a block diagram illustrating a portable electronic device 400 that performs method 100 (FIGS. 1 and 2), such as portable electronic device 210 (FIGS. 2 and 3). Portable electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in portable electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to portable electronic device 400.

Memory 424 may also include multiple program modules (or sets of instructions), including: application module 430 (or a set of instructions), financial application module 432 (or a set of instructions) and/or encryption module 434 (or a set of instructions). Note that one or more of these program modules (or sets of instructions) may constitute a computer-program mechanism.

During method 100 (FIGS. 1 and 2), portable electronic device 400 may be coupled to smart-card terminal 212 (FIGS. 2 and 3) via communication interface 412. Upon detecting a smart-card terminal, application module 430 may request account information 436 from a user (such as a merchant), for example, by displaying instructions on display 416. Then, application module 430 may receive account information 436 associated with the smart-card terminal from the user via keyboard 418. For example, account information 436 may be for an account with a financial institution 448 (such as bank) that processes financial transactions conducted using the smart-card terminal.

Moreover, application module 430 may provide the account information 436 to a remote server using communication module 428 and communication interface 412. Subsequently, application module 430 may receive a merchant identifier 438, a terminal identifier 440 and/or a configuration file 442 from the server using communication interface 412 and communication module 428. Next, application module 430 may provide this information to the smart-card terminal using communication module 428 and communication interface 412.

In this way, portable electronic device 400 can be used to facilitate programming of the smart-card terminal. After the smart-card terminal is programmed, it can be used to conduct financial transactions, such as payment by a customer for a good or service provided by the user. Thus, after the smart-card terminal is programmed, financial application module 432 and the smart-card terminal may be used to conduct one or more financial transactions 444 with one or more customers 446 and financial institution 448.

Because information in portable electronic device 400 may be sensitive in nature, in some embodiments at least some of the data stored in memory 424 and/or at least some of the data communicated using communication module 428 is encrypted using encryption module 434.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although portable electronic device 400 is illustrated as having a number of discrete items, FIG. 4 is intended to be a functional description of the various features that may be present in portable electronic device 400 rather than a structural schematic of the embodiments described herein. In practice, and as recognized by those of ordinary skill in the art, the functions of portable electronic device 400 may be distributed over a large number of electronic devices, servers or computers, with various groups of the servers or computers performing particular subsets of the functions. In some embodiments, some or all of the functionality of portable electronic device 400 may be implemented in one or more application-specific integrated circuits (ASICs) and/or one or more digital signal processors (DSPs).

In some embodiments financial application module 432 may include: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application module 432 may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Portable electronic devices (such as portable electronic device 400), as well as computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3) and/or portable electronic device 400 may include fewer components or additional components. Moreover, two or more components may be combined into a single component, and/or a position of one or more components may be changed. In some embodiments, the functionality of system 300 (FIG. 3) and/or portable electronic device 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable-electronic-device-implemented method for facilitating dynamic programming of a smart-card terminal, comprising:
   detecting a coupling of a first portable electronic device to the smart-card terminal;
   displaying, at a user interface on the first portable electronic device, a request for account information of a first merchant, wherein the account information is associated with a financial institution;
   receiving, from the first merchant at the user interface, the account information of the first merchant;
   providing the account information to a remote transmission hardware server using a data channel;
   receiving, from the remote transmission hardware server over the data channel, a first merchant identifier and a first terminal identifier;
   providing the first merchant identifier and the first terminal identifier to the smart-card terminal;
   programming the smart-card terminal via the first portable electronic device to enable the first merchant to use the smart-card terminal for conducting a financial transaction, wherein the smart-card terminal has not been previously configured by a manufacturer or distributer of the smart-card terminal for use by the first merchant;
   upon detecting a decoupling of the smart-card terminal from the first portable electronic device, ensuring that the first merchant identifier and the first terminal identifier are not available for use with the smart-card terminal; and
   upon detecting a coupling of a second portable electronic device to the smart-card terminal, providing a second merchant identifier and a second terminal identifier to the smart-card terminal, thereby facilitating programming of the smart-card terminal to enable a second merchant to use the smart-card terminal for conducting a financial transaction.

2. The method of claim 1, wherein, a first time the smart-card terminal is programmed, the method further comprises:
   receiving a smart-card-terminal configuration file which includes information specific to a financial institution associated with the smart-card terminal; and
   providing the smart-card-terminal configuration file to the smart-card terminal.

3. The method of claim 1, wherein the first merchant identifier and the first terminal identifier provided to the smart-card terminal are encrypted.

4. The method of claim 1, wherein the smart-card terminal includes a Europay MasterCard Visa terminal.

5. The method of claim 1, wherein, during a financial transaction, the smart-card terminal receives a user PIN code and financial information stored in a memory on a smart card.

6. The method of claim 1, wherein the first portable electronic device provides an electronic identity for the smart-card terminal to the remote transmission hardware server until the programming of the smart-card terminal is completed.

7. A computer-program product for use in conjunction with a portable electronic device, the computer-program product comprising a non-transitory computer-readable storage medium and a computer-program mechanism embedded therein, to facilitate dynamic programming of a smart-card terminal, the computer-program mechanism including:
  instructions for detecting a coupling of a first portable electronic device to the smart-card terminal;
  instructions for displaying, at a user interface on the first portable electronic device, a request for account information of a first merchant, wherein the account information is associated with a financial institution;
  instructions for receiving, from the first merchant at the user interface, the account information;
  instructions for providing the account information to remote transmission hardware server using a data channel;
  instructions for receiving, from the remote transmission hardware server over the data channel, a first merchant identifier and a first terminal identifier;
  instructions for providing the first merchant identifier and the first terminal identifier to the smart-card terminal;
  instructions for programming the smart-card terminal via the first portable electronic device to enable the first merchant to use the smart-card terminal for conducting a financial transaction, wherein the smart-card terminal has not been previously configured by a manufacturer or distributer of the smart-card terminal for use by the first merchant;
  instructions for, upon detecting a decoupling of the smart-card terminal from the first portable electronic device, ensuring that the first merchant identifier and the first terminal identifier are not available for use with the smart-card terminal; and
  instructions for, upon detecting a coupling of a second portable electronic device to the smart-card terminal, providing a second merchant identifier and a second terminal identifier to the smart-card terminal, thereby facilitating programming of the smart-card terminal to enable a second merchant to use the smart-card terminal for conducting a financial transaction.

8. The computer-program product of claim 7, wherein, a first time the smart-card terminal is programmed, the computer-program mechanism further includes:
  instructions for receiving a smart-card-terminal configuration file which includes information specific to a financial institution associated with the smart-card terminal; and
  instructions for providing the smart-card-terminal configuration file to the smart-card terminal.

9. The computer-program product of claim 7, wherein the first merchant identifier and the first terminal identifier provided to the smart-card terminal are encrypted.

10. The computer-program product of claim 7, wherein the smart-card terminal includes a Europay MasterCard Visa terminal.

11. The computer-program product of claim 7, wherein, during a financial transaction, the smart-card terminal receives a user PIN code and financial information stored in a memory on a smart card.

12. The computer-program product of claim 7, wherein the portable electronic device provides an electronic identity for the smart-card terminal to the remote transmission hardware server until the programming of the smart-card terminal is completed.

13. A portable electronic device, comprising:
  a processor;
  memory; and
  a program module, wherein the program module is stored in the memory and configurable to be executed by the processor to facilitate dynamic programming of a smart-card terminal, the program module including:
  instructions for detecting a coupling of a first portable electronic device to the smart-card terminal;
  instructions for displaying, at a user interface on the first portable electronic device, a request for account information of a first merchant, wherein the account information is associated with a financial institution;
  instructions for receiving, from the first merchant at the user-interface, the account information of the first merchant;
  instructions for providing the account information to a remote transmission hardware server using a data channel;
  instructions for receiving, from the remote transmission hardware server over the data channel, a first merchant identifier and a first terminal identifier;
  instructions for providing the first merchant identifier and the first terminal identifier to the smart-card terminal;
  instructions for programming the smart-card terminal via the first portable electronic device to enable the first merchant to use the smart-card terminal for conducting a financial transaction, wherein the smart-card terminal has not been previously configured by a manufacturer or distributer of the smart-card terminal for use by the first merchant;
  instructions for, upon detecting a decoupling of the smart-card terminal from the first portable electronic device, ensuring that the first merchant identifier and the first terminal identifier are not available for use with the smart-card terminal; and
  instructions for, upon detecting a coupling of a second portable electronic device to the smart-card terminal, providing a second merchant identifier and a second terminal identifier to the smart-card terminal, thereby facilitating programming of the smart-card terminal to enable a second merchant to use the smart-card terminal for conducting a financial transaction.

14. The portable electronic device of claim 13, wherein, a first time the smart-card terminal is programmed, the program module further includes:
  instructions for receiving a smart-card-terminal configuration file which includes information specific to a financial institution associated with the smart-card terminal; and
  instructions for providing the smart-card-terminal configuration file to the smart-card terminal.

15. The portable electronic device of claim 13, wherein the first merchant identifier and the first terminal identifier provided to the smart-card terminal are encrypted.

16. The portable electronic device of claim 13, wherein the smart-card terminal includes a Europay MasterCard Visa terminal.

17. The portable electronic device of claim 13, wherein, during a financial transaction, the smart-card terminal receives a user PIN code and financial information stored in a memory on a smart card.

18. The portable electronic device of claim 13, wherein the portable electronic device provides an electronic identity for the smart-card terminal to the remote transmission hardware server until the programming of the smart-card terminal is completed.

* * * * *